United States Patent
Tang

(10) Patent No.: US 10,972,930 B2
(45) Date of Patent: Apr. 6, 2021

(54) METHOD AND DEVICE FOR WIRELESS COMMUNICATION

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/098,429

(22) PCT Filed: Jul. 1, 2016

(86) PCT No.: PCT/CN2016/088243
§ 371 (c)(1),
(2) Date: Nov. 1, 2018

(87) PCT Pub. No.: WO2018/000439
PCT Pub. Date: Jan. 4, 2018

(65) Prior Publication Data
US 2019/0150012 A1    May 16, 2019

(51) Int. Cl.
*H04W 24/10* (2009.01)
*H04W 72/04* (2009.01)
(Continued)

(52) U.S. Cl.
CPC .......... *H04W 24/10* (2013.01); *H04W 4/027* (2013.01); *H04W 36/0069* (2018.08);
(Continued)

(58) Field of Classification Search
CPC ............. H04W 24/10; H04W 36/0069; H04W 72/0453; H04W 72/08; H04W 76/15; H04W 4/027
See application file for complete search history.

(56) References Cited

U.S. PATENT DOCUMENTS 7,949,302 B2    5/2011  Wilhelmsson
2002/0052201 A1 5/2002  Wilhelmsson
(Continued)

FOREIGN PATENT DOCUMENTS

CN   102450072 A   5/2012
CN   102595439 A   7/2012
(Continued)

OTHER PUBLICATIONS

International Search Report in international application No. PCT/CN2016/088243, dated Apr. 1, 2017.
Written Opinion of the International Search Authority in international application No. PCT/CN2015/088243, dated Apr. 1, 2017, with English translation provided by Google Translate.
(Continued)

*Primary Examiner* — Stephen J Clawson
(74) *Attorney, Agent, or Firm* — Ladas & Parry, LLP

(57) ABSTRACT

Disclosed are a method and device for wireless communication. The method comprises: a terminal obtains, from first carriers of a cell, operating parameters of second carriers of the cell, the frequency band where the first carriers are located being different from the frequency band where the second carriers are located; the terminal measures the second carriers of the cell according to the operating parameters of the second carriers of the cell to obtain a measurement result for the second carriers of the cell; the terminal determines a target carrier from the second carriers of the cell; the terminal communicates with a base station by means of the target carrier. According to the solution, the first and second carriers are configured in the cell, and the frequency bands where the first and second carriers are located different, and therefore, the characteristics of different frequency bands are utilized flexibly, so as to balance the design of an entire communication system.

10 Claims, 3 Drawing Sheets

(51) Int. Cl.
*H04W 36/00* (2009.01)
*H04W 76/15* (2018.01)
*H04W 72/08* (2009.01)
*H04W 4/02* (2018.01)

(52) U.S. Cl.
CPC ....... *H04W 72/0453* (2013.01); *H04W 72/08* (2013.01); *H04W 76/15* (2018.02)

(56) References Cited

U.S. PATENT DOCUMENTS

| | | | |
|---|---|---|---|
| 2009/0176453 A1 | 7/2009 | Wilhelmsson | |
| 2010/0027489 A1* | 2/2010 | Matsuzawa | H04W 16/12 370/329 |
| 2012/0077445 A1* | 3/2012 | Konno | H04L 5/0096 455/67.11 |
| 2013/0016690 A1* | 1/2013 | Jeong | H04W 24/10 370/329 |
| 2013/0034018 A1* | 2/2013 | Wei | H04W 72/0453 370/254 |
| 2013/0195073 A1* | 8/2013 | Chen | H04L 5/0032 370/331 |
| 2014/0029514 A1 | 1/2014 | Yu et al. | |
| 2014/0329526 A1* | 11/2014 | Sundararajan | H04W 36/24 455/436 |
| 2015/0223233 A1 | 8/2015 | Seo et al. | |
| 2015/0373674 A1* | 12/2015 | Han | H04L 5/001 370/329 |
| 2016/0330641 A1* | 11/2016 | Zhang | H04W 24/02 |
| 2017/0041819 A1* | 2/2017 | Wu | H04W 76/16 |
| 2017/0055313 A1* | 2/2017 | Sharma | H04W 36/0066 |
| 2017/0238316 A1* | 8/2017 | Li | H04W 72/0453 370/329 |
| 2017/0265241 A1* | 9/2017 | Fujishiro | H04W 76/15 |

FOREIGN PATENT DOCUMENTS

| | | |
|---|---|---|
| CN | 102724688 A | 10/2012 |
| CN | 105472651 A | 4/2016 |
| JP | 2013070159 A | 4/2013 |
| JP | 2014121010 A | 6/2014 |
| JP | 2017532887 A | 11/2017 |
| WO | 2010071126 A1 | 6/2010 |
| WO | 2012099514 A1 | 7/2012 |
| WO | 2015131672 A1 | 9/2015 |
| WO | 2016084865 A1 | 6/2016 |

OTHER PUBLICATIONS

Supplementary European Search Report in European application No. 16906838.4, dated Dec. 11, 2018.
3GPP Draft; RI-01-0253, 3rd Generation Partnership Project (3GPP), Mobile Competence Centre ; 650, Route Des Lucioles ; F-06921 Sophia-Antipolis Cedex; France, vol. RAN WGI, No. Las Vegas; Mar. 4, 2001, Mar. 4, 2001 (Mar. 4, 2001), XP050094273, [retrieved on Mar. 4, 2001]p. 6.
Ericsson: "Tight integration of the New Radio interface (NR) and LTE: User Plane design", 3GPP Draft; R2-162754—Tight Integration of the New Radio Interface (NR) and Lteuser Plane Design, 3rd Generation Partnership Project (3GPP), Mobile Competence Centre; 650, Route Des Lucioles; F-0 vol. RAN WG2, No. Dubrovnik, Croatia; Apr. 11, 2016-Apr. 15, 2016 Apr. 2, 2016 (Apr. 2, 2016), XP051082527.
Samsung: "Design Considerations for NR in Unlicensed Spectrum",3GPP Draft; R2-163746 Design Onsiderations for NR in Unlicensed Pectrum Fin, 3rd Generation Partnership Roject T3GPP), Mobile Competence Centre ; 650, Route Des Lucioles ; F-06921Sophia-Antipolis vol. RAN WG2, No. Nanjing, China; May 23, 2016-May 27, 2016 May 22, 2016 (May 22, 2016), XP051105159.
English Translation of the Written Opinion of the International Search Authority in international application No. PCT/CN2016/088243, dated Apr. 1, 2017.
International preliminary report on patentability of the International Search Authority for PCT/CN2016/088243 dated Jan. 1, 2019.
First Office Action of the Japanese application No. 2018-561266, dated Mar. 24, 2020.
First Office Action of the Indian application No. 201817047728, dated Jun. 25, 2020.
"3 Generation Partnership Project; Technical Specification Group Radio Access Network; Evolved Universal Terrestrial Radio Access(E-UTRA); User Equipment (UE) procedures in idle mode (Release13)", 3GPP Standard; 3GPP Ts 36.304, 3RD Generation Partnership Project (3GPP), Mobile Competence Centre; 650, Route Des Lucioles; F-06921 Sophia-Antipolis Cedex; France, vol. Ran WG2, No. V13.1.0, Mar. 30, 2016 (Mar. 30, 2016), pp. 1-43.
First Office Action of the European application No. 16906838.4, dated Oct. 26, 2020.
Decision of Refusal of the Japanese application No. 2018-561266, dated Dec. 1, 2020.
First Office Action of the Taiwanese application No. 106121729, dated Nov. 26, 2020.
First Office Action of the Chinese application No. 201680085240.3, dated Jan. 19, 2021.

\* cited by examiner

METHOD AND DEVICE FOR WIRELESS COMMUNICATION

CROSS-REFERENCE TO RELATED APPLICATIONS

The present application is the U.S. national phase of PCT Application PCT/CN2016/088243 filed on Jul. 1, 2016, entitled "METHOD AND DEVICE FOR WIRELESS COMMUNICATION", the disclosure of which is hereby incorporated by reference in its entirety.

TECHNICAL FIELD

The disclosure relates to the field of communications, and more particularly to a method and device for wireless communication.

BACKGROUND

In a communication system of a 5th-Generation (5G) mobile communication technology, in order to meet the requirement of the 5G communication system on high bandwidth transmission, a higher frequency band is inevitably used for communication. The existing 5G communication system may be deployed on a frequency band lower than 6 GHz or higher than 6 GHz.

However, when the 5G communication system is deployed on a relatively high frequency band, a cell coverage is greatly reduced compared with that in 4G and 3G communication systems. In order to enable the cell coverage of the 5G communication system to reach the cell coverage of the 4G and 3G communication systems, there is no choice but to deploy more cells in the 5G communication system and thus the complexity of deploying cells in the 5G communication system is increased. In other words, the overall 5G communication system will be unbalanced no matter whether the 5G communication system is deployed on the relatively high frequency band or deployed on the relatively low frequency band.

SUMMARY

The disclosure provides a method and device for wireless communication, which may flexibly utilize the characteristics of each frequency band to balance an overall communication system.

According to a first aspect, the disclosure provides a method for wireless communication, which includes the following operations. A terminal acquires operating parameters of second carriers of a cell from a first carrier of the cell, the frequency band where the first carrier is located being different from the frequency bands where the second carrier are located. The terminal measures the second carriers of the cell according to the operating parameters of the second carriers of the cell to obtain measurement results for the second carriers of the cell. The terminal determines a target carrier from the second carriers of the cell, and the terminal communicate with a base station through the target carrier.

In the solution of the disclosure, the first carrier and the second carriers are configured in the cell and the frequency bands where the first carrier and the second carriers are located are different, so that the characteristics of the different frequency bands are flexibly utilized to balance the design of the overall communication system (such as a 5G communication system).

In combination with the first aspect, in one implementation mode of the first aspect, the operation that the terminal determines the target carrier from the second carriers of the cell includes the following actions. The terminal sends the measurement results for the second carriers of the cell to the base station. The terminal receives first indication information sent by the base station, wherein the first indication information is used for indicating the target carrier and the target carrier is determined for the terminal by the base station based on the measurement results for the second carriers of the cell. The terminal determines the target carrier from the second carriers of the cell according to the first indication information.

In the solution, the base station may configure the target carrier for the terminal according to the measurement results of the terminal for the second carriers in the cell, so that the terminal may communicate with the base station through the target carrier that meets the transmission requirement of the terminal.

In combination with the first aspect or any abovementioned implementation mode, in another implementation mode of the first aspect, the method further includes the following operations. The terminal sends second indication information to the base station, wherein the second indication information includes at least one of position information of the terminal, a measurement result of the terminal for a Reference Signal (RS) of a target port or mobile velocity information of the terminal, so that the base station performs mobile management on the terminal based on the second indication information and updates the target carrier.

In the solution, the base station may perform the mobile management on the terminal based on the second indication information and update the target carrier for the terminal, so that the terminal may communicate with the base station via the target carrier that meets the transmission requirement of the terminal, and may guarantee the communication continuity of the terminal with the base station during moving.

In combination with the first aspect or any abovementioned implementation mode, in another implementation mode of the first aspect, the operation that the terminal determines the target carrier from the second carriers of the cell includes: the terminal determines the target carrier from the second carriers of the cell according to the measurement results for the second carriers of the cell.

In the solution, the terminal may actively determine the target carrier for itself based on the measurement results for the second carriers in the cell, so that the terminal may communicate with the base station via the target carrier that meets the transmission requirement of the terminal.

In combination with the first aspect or any abovementioned implementation mode, in another implementation mode of the first aspect, the operating parameters of the second carriers include coverage ranges of the second carriers, and the operation that the terminal determines the target carrier from the second carriers of the cell according to the measurement results for the second carriers of the cell includes: the terminal determines the target carrier from the second carriers of the cell according to the measurement results for the second carriers of the cell, the position information of the terminal and the coverage ranges of the second carriers.

In the solution, the terminal may determine the target carrier for itself based on the measurement results for the second carriers in the cell, the position information of the terminal and the coverage ranges of the second carriers, so that the terminal may communicate via the target carrier that meets the transmission requirement of the terminal and select a more reasonable target carrier for itself.

In combination with the first aspect or any abovementioned implementation mode, in another implementation mode of the first aspect, the frequency band for the first carrier of the cell is lower than the frequency bands for the second carriers of the cell.

In the solution, the first carrier and the second carriers are respectively deployed on different frequency bands, and the terminal may acquire the operating parameters of the second carriers at the relatively high frequency bands through the first carrier at the relatively low frequency band, so that the characteristics of different frequency bands are flexibly utilized to balance the design of the overall communication system.

In combination with the first aspect or any abovementioned implementation mode, in another implementation mode of the first aspect, the operating parameters of the second carriers of the cell are configuration parameters on RSs of the second carriers of the cell, and the measurement results for the second carriers of the cell are used for indicating qualities of the RSs of the second carriers of the cell.

According to a second aspect, the disclosure provides a method for wireless communication, which includes the following operations. After a terminal acquires operating parameters of second carriers of a cell via a first carrier of the cell, a base station receives measurement results for the second carriers of the cell from the terminal. The base station determines a target carrier from the second carriers of the cell. The base station sends first indication information to the terminal, wherein the first indication information is used for indicating the target carrier.

In the solution of the disclosure, the first carrier and the second carriers are configured in the cell and the frequency bands where the first carrier and the second carriers are located are different, such that the characteristics of the different frequency bands are flexibly utilized to balance the design of the overall communication system (such as a 5G communication system).

In combination with the second aspect, in one implementation mode of the second aspect, the method further includes the following operations. The base station receives second indication information sent by the terminal, wherein the second indication information includes at least one of position information of the terminal, a measurement result of the terminal for an RS of a target port and mobile velocity information of the terminal. The base station performs mobile management on the terminal based on the second indication information and updates the target carrier.

In the solution, the base station may perform the mobile management on the terminal based on the second indication information and update the target carrier for the terminal, so that the terminal may communicate with the base station via the target carrier that meets the transmission requirement of the terminal, and may guarantee the communication continuity of the terminal with the base station during moving.

In combination with the second aspect or any abovementioned implementation mode, in another implementation mode of the second aspect, the frequency band for the first carrier of the cell is lower than the frequency bands for the second carriers of the cell.

In the solution, the first carrier and the second carriers are respectively deployed on different frequency bands, and the terminal may acquire the operating parameters of the second carriers at the relatively high frequency bands through the first carrier at the relatively low frequency band, so that the characteristics of different frequency bands are flexibly utilized to balance the design of the overall communication system.

In combination with the second aspect or any abovementioned implementation mode, in another implementation mode of the second aspect, the operating parameters of the second carriers of the cell are configuration parameters on RSs of the second carriers of the cell, and the measurement results are used for indicating qualities of the RSs of the second carriers of the cell.

According to a third aspect, the disclosure provides a device for wireless communication. The device includes modules configured to execute the method in the first aspect.

According to a fourth aspect, the disclosure provides a device for wireless communication. The device includes modules configured to execute the method in the second aspect.

According to a fifth aspect, the disclosure provides a device for wireless communication. The device includes a memory, a processor, an input/output interface, a communication interface and a bus system. The memory, the processor, the input/output interface and the communication interface are connected through the system bus. The memory may be configured to store an instruction. The processor may be configured to execute the instruction stored in the memory, and when the instruction is executed, the processor may execute the method according to the first aspect through the communication interface and control the input/output interface to receive input data and information and output data such as an operation result.

According to a sixth aspect, the disclosure provides a device for wireless communication. The device includes a memory, a processor, an input/output interface, a communication interface and a bus system. The memory, the processor, the input/output interface and the communication interface are connected through the system bus. The memory may be configured to store an instruction. The processor may be configured to execute the instruction stored in the memory, and when the instruction is executed, the processor may execute the method according to the second aspect through the communication interface and control the input/output interface to receive input data and information and output data such as an operation result.

According to a seventh aspect, the disclosure provides a computer-readable storage medium. The computer-readable storage medium may be configured to store a program code for the method for wireless communication, and the program code may be configured to execute method instructions in the first aspect.

According to an eighth aspect, the disclosure provides a computer-readable storage medium. The computer-readable storage medium may be configured to store a program code for the method for wireless communication, and the program code may be configured to execute method instructions in the second aspect.

In some implementation modes, the first carrier may be referred to as a basic carrier, and the second carriers may be referred to working carriers.

In some implementation modes, the terminal determines the target carrier from the second carriers of the cell, wherein the target carrier may be determined based on the measurement results for the second carriers of the cell.

In some implementation modes, at least one second carrier is provided in the cell.

In some implementation modes, the base station determines the target carrier from the second carriers of the cell. In at least one alternative implementation mode, the base station determines the target carrier from the second carriers of the cell according to the measurement results for the second carriers of the cell.

BRIEF DESCRIPTION OF DRAWINGS

In order to describe the technical solutions in the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

It should be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) and the like.

It is also to be understood that User Equipment (UE) may also be called a mobile terminal, a mobile user device and the like and may communicate with one or more core networks through, for example, a Radio Access Network (RAN). The UE may be a mobile terminal, for example, a mobile phone (or called as a "cellular" phone) and a computer with a mobile terminal, may be, for example, a portable, pocket, handheld, computer-embedded or vehicle-mounted mobile device and performs language and/or data exchange with the RAN.

A base station may be a Base Transceiver Station (BTS) in the GSM or CDMA, may also be a Node B in WCDMA and may further be an Evolutional Node B (eNB or e-NodeB) in LTE. There are no limits made in the disclosure. However, for convenient description, descriptions will be made in the following embodiments with a Node B as an example.

Figure 1:
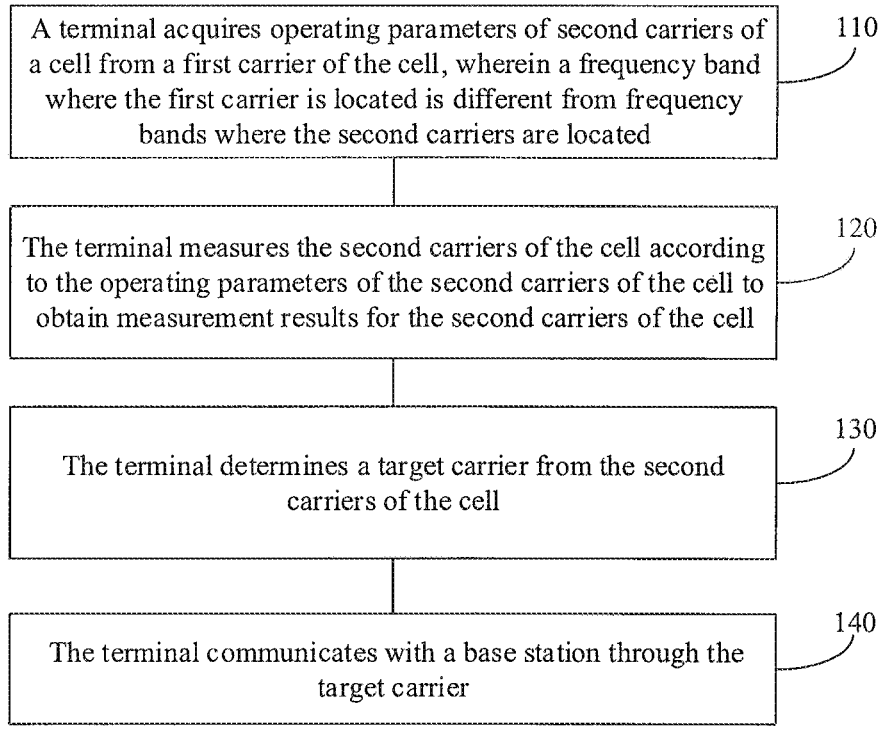
FIG. 1 is a schematic flowchart of a method for wireless communication according to an embodiment of the disclosure.

FIG. 1 is a schematic flowchart of a method for wireless communication according to an embodiment of the disclosure. The method illustrated in FIG. 1 includes the following operations.

At 110, a terminal acquires operating parameters of second carriers of a cell from a first carrier of the cell, wherein a frequency band where the first carrier is located is different from frequency bands where the second carriers are located.

Specifically, in the operation at 110, the terminal may acquire operating parameters of each of at least one second carrier (it may be referred to a working carrier) in the cell through the first carrier (it may be referred to a basic carrier).

In an optional embodiment, the operating parameters of the second carriers may include working frequency point information of the second carriers, system bandwidth information of the second carriers, time synchronization information of the second carriers relative to the first carrier, sub-carrier interval information of the second carriers, signal prefix information of the second carriers, configuration information on sub-frame structure of the second carriers, configuration information on uplink and downlink time slots of the second carriers, configuration information on synchronization signals of the second carriers, configuration information on RSs of the second carriers, Identifier (ID) information of the second carriers and antenna configuration information of the second carriers.

Specifically, the time synchronization information of the second carriers relative to the first carrier may refer to time offsets of the second carriers relative to the first carrier, for example, wireless frame offsets of the second carriers relative to the first carrier, sub-frame offsets of the second carriers relative to the first carrier, Transmission Time Interval (TTI) offsets of the second carriers relative to the first carrier and transmission symbol offsets of the second carriers relative to the first carrier.

The signal prefix information of the second carriers includes at least one of prefix type information of signals or prefix length information of the signals.

The configuration information on sub-frame structure of the second carriers may include configuration information on the total number of Orthogonal Frequency Division Multiplexing (OFDM) symbols in sub-frames of the second carriers, the number or positions of guard periods in the sub-frames of the second carriers and the number of different types of OFDM symbols in the sub-frames of the second carriers, for example, the number of downlink control symbols, downlink data symbols and uplink control symbols in the sub-frames, proportion configurations on the number of downlink control symbols, downlink data symbols and uplink control symbols in the sub-frames, the number of downlink control symbols and uplink data symbols in the sub-frames, and proportion configurations on the downlink control symbols and uplink data symbols in the sub-frames.

The configuration information on the synchronization signals of the second carriers includes time-frequency resource position information of the synchronization signals and/or sequence information carried by the synchronization signals. The resource position information on the synchronization signals of the second carriers is used for indicating time-frequency resource configuration information of the synchronization signals, sub-frames where the synchronization signals are located and symbols where the synchronization signals are located.

The configuration information on the RSs of the second carriers may include: time-frequency resource configuration information of the RSs, sequence information of the RSs, transmitting power configuration information of the RSs and port configuration information of the RSs. The time-frequency resource configuration information of the RSs may be configuration information on time-frequency resource transmission patterns of the RSs, transmission cycles for transmitting the RSs, configuration information on subframes for transmitting the RSs, and the like. The sequence information of the RSs may be scrambling sequence IDs of the RSs, orthogonal code lengths of the RSs, orthogonal code types of the RSs and other information. The port configuration information of the RSs may be the number of physical antenna ports that are combined to form the RSs.

It should be understood that, the operation of the terminal acquiring the operating parameters of the second carrier from the first carrier may include that the terminal acquires the operating parameters of the second carrier from a dedicated signaling (such as a Radio Resource Control signaling) transmitted on the first carrier by the base station, and may further include that the terminal receives the operating parameters of the second carriers that are broadcasted on the first carrier by the base station. The mode that the base station sends the operating parameters of the second carriers through the first carrier is not limited in the embodiments of the disclosure.

It should be further understood that the base station may send operating parameter tables of the second carriers to the terminal through the first carrier. The working parameter tables of the second carriers are used for indicating a correspondence between the second carriers and the operating parameters. There are no limits made to the representation of the correspondence between the second carriers and the operating parameters in the disclosure.

It should be further understood that, the terminal may transmit data of a service without a requirement on a high transmission rate via the first carrier.

It should be further understood that, the second carriers may be transmitted by different beams that are formed by different radio transmission points, Radio Remote Units (RRUs), distributed antenna and massive MIMOs distributed in the cell.

In an optional embodiment, the frequency band for the first carrier of the cell is lower than the frequency bands for the second carriers of the cell.

It is to be noted that, the frequency bands where the second carriers are located may be the same and may also be different. In other words, the space coverage areas of different second carriers may be different. The second carriers may be arranged at relatively high frequency bands. For example, the second carriers are arranged on frequency bands higher than 6 GHz, so as to meet service requirements of a large bandwidth and a relatively high rate in the 5G communication system.

The first carrier may be arranged on a lower frequency band to form a larger coverage range. For example, the first carrier may be arranged on a frequency band lower than 6 GHz. The first carrier may be a carrier in an existing LTE system and may further be a carrier on a frequency band for providing a relatively small data transmitting capacity in the 5G communication system.

It is to be noted that, when the first carrier is a carrier in the LTE system, the terminal may access the cell through a cell access procedure of the LTE. When the first carrier is a carrier in the 5G communication system, the terminal may access to the cell through a cell access technology in the 5G communication system. There are no limits made to the approach for accessing the cell by the terminal in the disclosure.

At 120, the terminal measures the second carriers of the cell according to the operating parameters of the second carriers of the cell to obtain measurement results for the second carriers of the cell.

In an optional embodiment, the operating parameters of the second carriers of the cell are configuration parameters on Reference Signals (RSs) of the second carriers of the cell, and the measurement results for the second carriers of the cell are used for indicating the qualities of the RSs of the second carriers of the cell.

For example, the configuration parameters on the RSs of the second carriers may refer to resource configuration parameters of the RSs of the second carriers. In other words, the terminal may receive the RSs according to the resource configuration parameters of the RSs. Based on the received RSs, the terminal obtains quality information of the RSs in a specified measurement bandwidth, such as a Reference Signal Received Power (RSRP), a Reference Signal Received Quality (RSRQ) or the like. The terminal may generate measurement results for the second carriers according to the quality information of the RSs.

At 130, the terminal determines a target carrier from the second carriers of the cell according to the measurement results for the second carriers of the cell.

Specifically, the target carrier is one of the second carriers. The target carrier may be configured in the frequency bands where the second carriers are located.

In an optional embodiment, the operation that the terminal determines a target carrier from the second carriers of the cell according to the measurement results for the second carriers in the cell includes the following actions. The terminal sends the measurement results for the second carriers of the cell to the base station. The terminal receives first indication information sent by the base station, wherein the first indication information is used for indicating the target carrier and the target carrier is determined for the terminal by the base station based on the measurement results for the second carriers of the cell, and the terminal determines the target carrier from the second carriers of the cell according to the first indication information.

For example, the terminal acquires the configuration parameters on the RSs of the second carriers (which may be taken as one example for the operating parameters of the second carriers) in the cell through the first carrier. The terminal detects the RSs of the second carriers in the cell according to the configuration parameters on the RSs of the second carriers in the cell, determines qualities for receiving the RSs of the second carriers in the cell (which may be taken as one example for the measurement results of the second carriers) by the terminal and sends the qualities of the RSs of the second carriers in the cell to the base station. The base station may configure the target carrier meeting the communication requirement of the terminal for the terminal according to the qualities of the RSs of the second carriers in the cell. The base station sends information of the target carrier to the terminal via the first indication information, and the terminal determines the target carrier according to the information of the target carrier carried in the first indication information.

In an optional embodiment, the method further includes the following operations. The terminal sends second indication information to the base station, wherein the second indication information includes at least one of position information of the terminal, a measurement result of the terminal for an RS of a target port or mobile velocity information of the terminal, so that the base station performs mobile management on the terminal based on the second indication information and updates the target carrier.

Specifically, the base station may determine relative positions between the base station and the terminal according to at least one of the position information of the terminal or the measurement result of the terminal for the RS of the target port. The base station may determine whether the terminal needs to perform a handover operation of the target carrier according to at least one of the relative positions or a mobile velocity of the terminal.

It is to be noted that, the base station determines the relative positions between the base station and the terminal according to the measurement result for the RS of the target port. For example, the base station determines the relative positions between the base station and the terminal according to signal intensities of different wireless transmission points. In other words, the base station may send a target wireless transmission point to the terminal, the terminal may measure a signal of the target wireless transmission point, and the base station may determine the relative positions between the terminal and the base station according to a measurement result of signal strength of the target wireless transmission point sent by the terminal.

It should be understood that, the base station may further configure the target carrier for the terminal according to the relative positions between the base station and the terminal and the measurement results for the second carriers in the cell.

In an optional embodiment, the operation that the terminal determines a target carrier from the second carriers of the cell according to the measurement results for the second carriers in the cell includes: the terminal determines the target carrier from the second carriers of the cell according to the measurement results for the second carriers of the cell.

Specifically, the terminal may actively select the target carrier from the second carriers of the cell according to the measurement results for the second carriers of the cell.

It is to be noted that, the terminal may actively select the target carrier from the second carriers of the cell according to the measurement results for the second carriers of the cell, which may indicate that the terminal actively selects the target carrier from the second carriers of the cell according to the measurement results for the second carriers of the cell as well as a preset condition for selecting a target carrier.

It should be further understood that the preset condition for selecting a target carrier may be a transmitting quality of an RS on the carrier or a threshold of a reference signal transmitted power, which will not be limited in the disclosure.

In an optional embodiment, the operating parameters of the second carriers include coverage ranges of the second carriers. The operation that the terminal determines the target carrier from the second carriers of the cell according to the measurement results for the second carriers of the cell includes: the terminal determines the target carrier from the second carriers of the cell according to the measurement results for the second carriers of the cell, the position information of the terminal and the coverage ranges of the second carriers.

It is to be noted that, the terminal may further determine whether the target carrier needs to be handed over according to the measurement results for the second carriers, the position information of the terminal and the coverage ranges of the second carriers.

In an optional embodiment, the terminal may further determine whether the target carrier needs to be handed over according to an automatic velocity of the terminal, the measurement results for the second carriers, the position information of the terminal and the coverage ranges of the second carriers.

At 140, the terminal communicates with the base station through the target carrier.

Specifically, the terminal may receive a scheduling instruction sent by the base station via the target carrier, and may further transmit a service via the target carrier, such as a 5G service.

It is to be noted that, when the base station determines that the requirement of a service to be transmitted by the terminal on the transmission quality is not high, that is, the first carrier may meet the transmission quality required by the service, the base station may instruct the terminal to perform data transmission of the service via the first carrier.

According to the solution of the disclosure, the first carrier and the second carriers are configured in the cell and the frequency bands where the first carrier and the second carriers are located are different, so that the characteristics of the different frequency bands are flexibly utilized to balance the design of the overall communication system (such as a 5G communication system).

Figure 2:
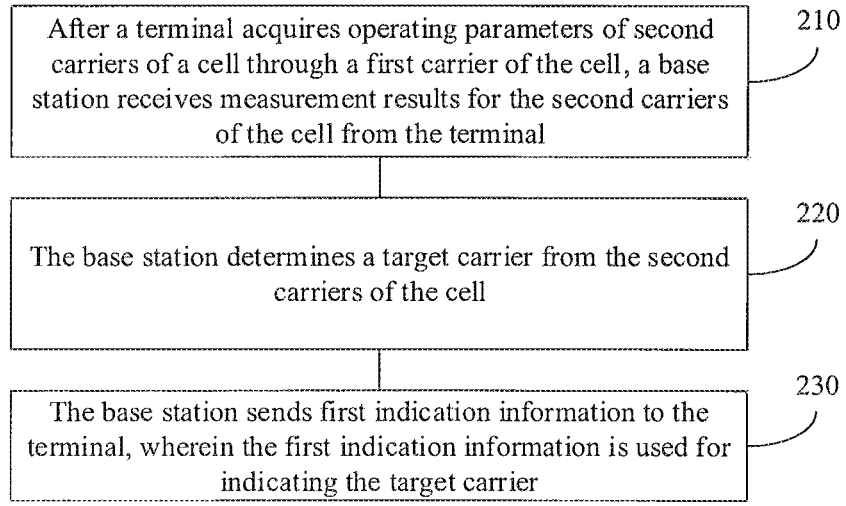
FIG. 2 is a schematic flowchart of a method for wireless communication according to another embodiment of the disclosure.

FIG. 2 is a schematic flowchart of a method for wireless communication according to another embodiment of the disclosure. It should be understood that specific details of the method illustrated in FIG. 2 are illustrated in detail when describing the method illustrated in FIG. 1, which will not be elaborated herein to avoid repetitions. The method illustrated in FIG. 2 includes the following operations.

At 210, after a terminal acquires operating parameters of second carriers of a cell through a first carrier of the cell, a base station receives measurement results for the second carriers of the cell from the terminal.

In an optional embodiment, the frequency band for the first carrier of the cell is lower than the frequency bands for the second carriers of the cell.

At 220, the base station determines a target carrier from the second carriers of the cell.

Specifically, multiple second carriers may be configured in the cell. The base station may configure for the terminal a target carrier that meets the transmission requirement of the terminal according to measurement results for the multiple second carriers sent by the terminal.

It is to be noted that, when the base station determines that the requirement of a service to be transmitted by the terminal on the transmission quality is not high, that is, the first carrier may meet the transmission quality required by the service, the base station may instruct the terminal to perform data transmission of the service via the first carrier.

In an optional embodiment, the operating parameters of the second carriers of the cell are configuration parameters on RSs of the second carriers of the cell, and the measurement results for the second carriers of the cell are used for indicating qualities of the RSs of the second carriers of the cell.

At 230, the base station sends first indication information to the terminal, wherein the first indication information is used for indicating the target carrier.

Specifically, the first indication information may include frequency band information on a frequency band where the target carrier is located. The first indication information may further include information such as an index of the target carrier.

In the solution of the disclosure, the first carrier and the second carriers are configured in the cell and the frequency bands where the first carrier and the second carriers are located are different, so that the characteristics of the different frequency bands are flexibly utilized to balance the design of the overall 5G communication system.

In an optional embodiment, the base station receives second indication information sent by the terminal, wherein the second indication information includes at least one of position information of the terminal, a measurement result of the terminal for an RS of a target port or mobile velocity information of the terminal. The base station performs mobile management on the terminal based on the second indication information and updates the target carrier.

Specifically, according to the position information of the terminal and the measurement result of the terminal for the RS of the target port from the terminal, relative position between the terminal and the base station are determined. The base station updates the target carrier for the terminal according to the relative position and a mobile velocity of the terminal.

It should be understood that, the base station may send third indication information to the terminal, wherein the third indication information is used for instructing the terminal to send the second indication information to the base station. The terminal may also actively send the second indication information to the base station. There are no limits made in the embodiments of the disclosure.

It should be further understood that, updating the target carrier may indicate a handover from a first target carrier to a second target carrier. Herein, the first target carrier and the second target carrier may be within a same cell (i.e., within a coverage range of the same first carrier).

The method for wireless communication according to the embodiments of the disclosure is described above in detail in combination with FIG. 1 and FIG. 2. A device for wireless communication according to the embodiments of the disclosure will be described below in detail in combination with FIG. 3 to FIG. 6. It should be understood that the device illustrated in FIG. 3 and FIG. 5 may implement each operation in FIG. 1 and the device illustrated in FIG. 4 and FIG. 6 may implement each operation in FIG. 2, all of which will not be elaborated herein for avoiding repetitions.

Figure 3:
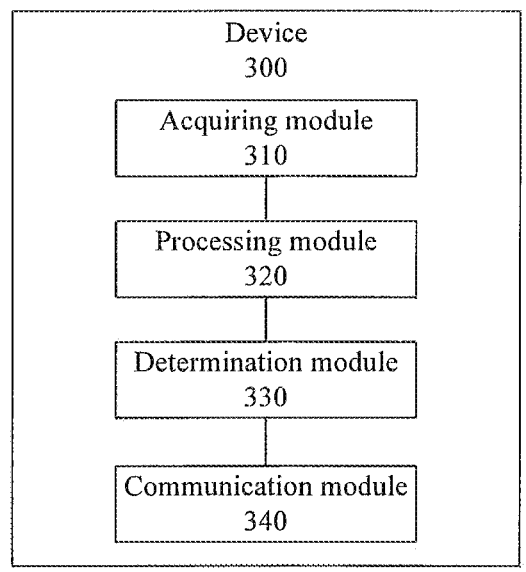
FIG. 3 is a schematic block diagram of a device for wireless communication according to an embodiment of the disclosure.

FIG. 3 is a schematic block diagram of a device for wireless communication according to an embodiment of the disclosure. The device illustrated in FIG. 3 includes an acquiring module 310, a processing module 320, a determination module 330 and a communication module 340.

The acquiring module 310 is configured to acquire operating parameters of second carriers of a cell from a first carrier of the cell, the frequency band where the first carrier is located being different from the frequency bands where the second carrier are located.

The processing module 320 is configured to measure the second carriers of the cell according to the operating parameters of the second carriers of the cell to obtain measurement results for the second carriers of the cell.

The determination module 330 is configured to determine a target carrier from the second carriers of the cell.

The communication module 340 is configured to communicate with a base station through the target carrier.

In the solution of the disclosure, the first carrier and the second carriers are configured in the cell and the frequency bands where the first carrier and the second carriers are located are different, so that the characteristics of the different frequency bands are flexibly utilized to balance the design of the overall 5G communication system.

In an optional embodiment, the determination module may specifically be configured to send the measurement results for the second carriers of the cell to the base station, receive first indication information sent by the base station, the first indication information being used for indicating the target carrier and the target carrier being determined by the base station for the terminal based on the measurement results for the second carriers of the cell, and determine the target carrier from the second carriers of the cell according to the first indication information.

In an optional embodiment, the device further includes a sending module. The sending module may be configured to send second indication information to the base station to enable the base station to perform mobile management on the terminal based on the second indication information and update the target carrier, wherein the second indication information includes at least one of position information of the terminal, a measurement result of the terminal for an RS of a target port or mobile velocity information of the terminal.

In an optional embodiment, the determination module may specifically be configured to determine the target carrier from the second carriers of the cell according to the measurement results for the second carriers of the cell.

In an optional embodiment, the operating parameters of the second carriers include coverage ranges of the second carriers. The determination module may further be configured to determine the target carrier from the second carriers of the cell according to the measurement results for the second carriers of the cell, the position information of the terminal and the coverage ranges of the second carriers.

In an optional embodiment, the frequency band for the first carrier of the cell may be lower than the frequency bands for the second carriers of the cell.

In an optional embodiment, the operating parameters of the second carriers of the cell may be configuration parameters on RSs of the second carriers of the cell, and the measurement results for the second carriers of the cell may be used for indicating qualities of the RSs of the second carriers of the cell.

Figure 4:
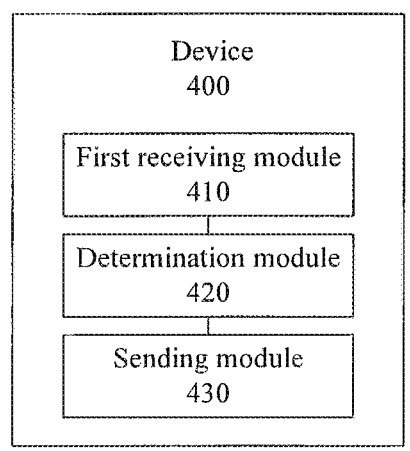
FIG. 4 is a schematic block diagram of a device for wireless communication according to another embodiment of the disclosure.

FIG. 4 is a schematic block diagram of a device for wireless communication according to another embodiment of the disclosure. The device illustrated in FIG. 4 includes a first receiving module 410, a determination module 420 and a sending module 430.

The first receiving module 410 is configured to receive, after a terminal acquires operating parameters of second carriers of a cell through a first carrier of the cell, measurement results for the second carriers of the cell from the terminal.

The determination module 420 is configured to determine a target carrier from the second carriers of the cell.

The sending module 430 is configured to send first indication information to the terminal, wherein the first indication information is used for indicating the target carrier.

In the solution of the disclosure, the first carrier and the second carriers are configured in the cell and the frequency bands where the first carrier and the second carriers are located are different, so that the characteristics of the different frequency bands are flexibly utilized to balance the design of the overall communication system (such as a 5G communication system).

In an optional embodiment, the device may further include a second receiving module and an update module. The second receiving module may be configured to receive second indication information sent by the terminal, wherein the second indication information includes at least one of position information of the terminal, a measurement result of the terminal for an RS of a target port or mobile velocity information of the terminal. The update module may be configured to perform mobile management on the terminal based on the second indication information and update the target carrier.

In an optional embodiment, the frequency band for the first carrier of the cell may be lower than the frequency bands for the second carriers of the cell.

In an optional embodiment, the operating parameters of the second carriers of the cell may be configuration parameters on RSs of the second carriers of the cell, and the measurement results for the second carriers of the cell may be used for indicating qualities of the RSs of the second carriers of the cell.

Figure 5:
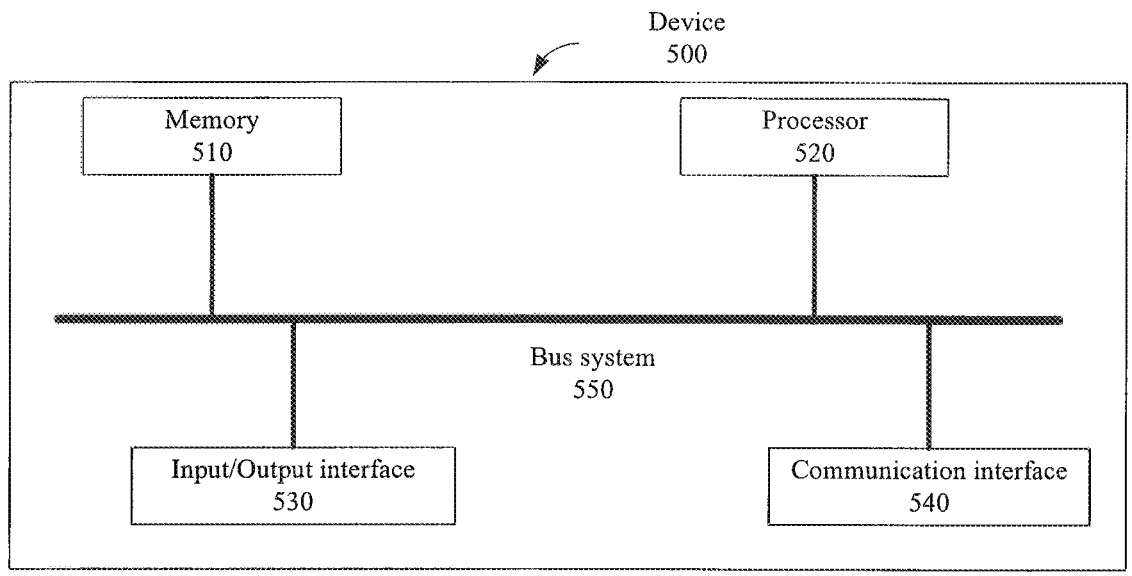
FIG. 5 is a schematic block diagram of a device for wireless communication according to another embodiment of the disclosure.

FIG. 5 is a schematic block diagram of a device for wireless communication according to another embodiment of the disclosure. The device 500 for signal detection or measurement illustrated in FIG. 5 may be a first transmission point. The device 500 includes a memory 510, a processor 520, an input/output interface 530, a communication interface 540 and a bus system 550. The memory 510, the processor 520, the input/output interface 530 and the communication interface 540 are connected via the bus system 550. The memory 510 may be configured to store an instruction. The processor 520 may be configured to execute the instruction stored in the memory 520 to control the input/output interface 530 to receive input data and information, output data such as an operation result and control the communication interface 540 to transmit a signal.

The communication interface 540 may be configured to acquire operating parameters of second carriers of a cell from a first carrier of the cell, the frequency band where the first carrier is located being different from the frequency bands where the second carrier are located.

The processor 520 may be configured to measure the second carriers of the cell according to the operating parameters, obtained by the acquiring module, of the second carriers of the cell to obtain measurement results for the second carriers of the cell, and may further be configured to determine a target carrier from the second carriers of the cell.

The communication module 540 may be configured to communicate with the base station through the target carrier.

It should be understood that in the embodiments of the disclosure, the processor 520 may adopt a universal Central Processing Unit (CPU), a microprocessor, an Application Specific Integrated Circuit (ASIC) or one or more integrated circuit, and may be configured to execute a related program to implement the technical solutions provided in the embodiments of the disclosure.

It should be further understood that the communication interface 540 employs, for example, but not limited to, a transceiver device such as a transceiver to implement communication between the device 500 for signal detection or measurement and other devices or communication networks.

The memory 510 may include a Read-Only Memory (ROM) and a Random-Access Memory (RAM) and provides instructions and data to the processor 520. A part of the processor 520 may further include a nonvolatile RAM. For example, the processor 520 may further store information of a device type.

The bus system 550 may include a data bus, and may further include a power bus, a control bus, a state signal bus and the like. However, for clear description, various buses in the figure are marked as the bus system 550.

In an implementation process, each operation of the method may be completed by an integrated logic circuit of hardware in the processor 520 or an instruction in a software form. The method for wireless communication disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory 510. The processor 520 reads information in the memory 510 and completes the operations of the method in combination with hardware. No more detailed descriptions will be made herein to avoid repetitions.

In the solution of the disclosure, the first carrier and the second carriers are configured in the cell and the frequency bands where the first carrier and the second carriers are located are different, such that the characteristics of the different frequency bands are flexibly utilized to balance the design of the overall 5G communication system.

In an optional embodiment, the processor 520 may specifically be configured to send the measurement results for the second carriers of the cell to the base station, receive first indication information sent by the base station, the first indication information being used for indicating the target carrier and the target carrier being determined by the base station for the terminal based on the measurement results for the second carriers of the cell, and determine the target carrier from the second carriers of the cell according to the first indication information.

In an optional embodiment, the communication interface 540 may be configured to send second indication information to the base station, to enable the base station to perform mobile management on the terminal based on the second indication information and update the target carrier, wherein the second indication information includes at least one of position information of the terminal, a measurement result of the terminal for an RS of a target port or mobile velocity information of the terminal.

In an optional embodiment, the processor 520 may specifically be configured to determine the target carrier from the second carriers of the cell according to the measurement results for the second carriers of the cell.

In an optional embodiment, the operating parameters of the second carriers include coverage ranges of the second carriers, and the processor 520 may further be configured to determine the target carrier from the second carriers of the cell according to the measurement results for the second carriers of the cell, the position information of the terminal and the coverage ranges of the second carriers.

In an optional embodiment, the frequency band for the first carrier of the cell may be lower than the frequency bands for the second carriers of the cell.

In an optional embodiment, the operating parameters of the second carriers of the cell may be configuration parameters on RSs of the second carriers of the cell, and the measurement results for the second carriers of the cell may be used for indicating the qualities of the RSs of the second carriers of the cell.

Figure 6:
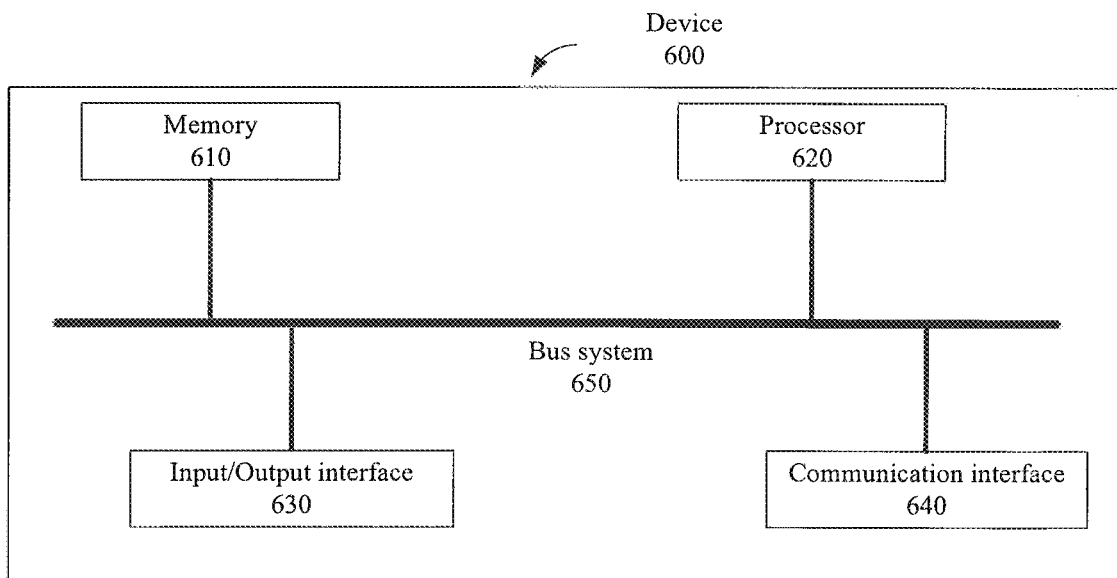
FIG. 6 is a schematic block diagram of a device for wireless communication according to another embodiment of the disclosure.

FIG. 6 is a schematic block diagram of a device for wireless communication according to another embodiment of the disclosure. The device 600 for signal detection or measurement illustrated in FIG. 6 may be a base station. The device 600 includes a memory 610, a processor 620, an input/output interface 630, a communication interface 640 and a bus system 650. The memory 610, the processor 620, the input/output interface 630 and the communication interface 640 are connected via the bus system 650. The memory 610 may be configured to store an instruction. The processor 620 may be configured to execute the instruction stored in the memory 620 to control the input/output interface 630 to receive input data and information, output data such as an operation result and control the communication interface 640 to transmit a signal.

The communication interface 640 may be configured to receive, after a terminal acquires operating parameters of second carriers of a cell through a first carrier of the cell, measurement results for the second carriers of the cell from the terminal.

The processor 620 may be configured to determine a target carrier from the second carriers of the cell.

The communication interface 640 may be configured to send first indication information to the terminal, wherein the first indication information is used for indicating the target carrier.

It should be understood that in the embodiments of the disclosure, the processor 620 may adopt a universal Central Processing Unit (CPU), a microprocessor, an Application Specific Integrated Circuit (ASIC), or one or more integrated circuit, and may be configured to execute a related program to implement the technical solutions provided in the embodiments of the disclosure.

It should be further understood that the communication interface 640 employs, for example but not limited to, a transceiver device such as a transceiver to implement communication between the device 600 for signal detection or measurement and other devices or communication networks.

The memory 610 may include a Read-Only Memory (ROM) and a Random-Access Memory (RAM) and provides instructions and data to the processor 620. A part of the processor 620 may further include a nonvolatile RAM. For example, the processor 620 may further store information of a device type.

The bus system 650 may include a data bus, and may further include a power bus, a control bus, a state signal bus and the like. However, for clear description, various buses in the figure are marked as the bus system 650.

In an implementation process, each operation of the method may be completed by an integrated logic circuit of hardware in the processor 620 or an instruction in a software form. The method for wireless communication disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory 610. The processor 620 reads information in the memory 610 and completes the operations of the abovementioned method in combination with hardware. No more detailed descriptions will be made herein to avoid repetitions.

In the solution of the disclosure, the first carrier and the second carriers are configured in the cell and the frequency bands where the first carrier and the second carriers are located are different, so that the characteristics of the different frequency bands are flexibly utilized to balance the design of the overall 5G communication system.

In an optional embodiment, the communication interface 640 may be configured to receive second indication information sent by the terminal, wherein the second indication information includes at least one of position information of the terminal, a measurement result of the terminal for an RS of a target port or mobile velocity information of the terminal, and an update module may be configured to perform mobile management on the terminal based on the second indication information and update the target carrier.

In an optional embodiment, the frequency band for the first carrier of the cell may be lower than the frequency bands for the second carriers of the cell.

In an optional embodiment, the operating parameters of the second carriers of the cell may be configuration parameters on RSs of the second carriers of the cell, and the measurement results for the second carriers of the cell may be used for indicating the qualities of the RSs of the second carriers of the cell.

It should be understood that in the embodiments of the disclosure, "B corresponding to A" represents that B is associated with A and B may be determined according to A. It is also to be understood that determining B according to A does not mean that B is determined only according to A and B may also be determined according to A and/or other information.

It should be understood that term "and/or" in the disclosure is only an association relationship for describing associated objects and represents that three relationships may exist. For example, A and/or B may represent three conditions: i.e., independent existence of A, existence of both A and B and independent existence of B. In addition, the character "/" in the disclosure usually represents that previous and next associated objects form an "or" relationship.

It should be understood that in various embodiments of the disclosure, a sequence number of each process does not mean an execution sequence and the execution sequence of each process should be determined by its function and an internal logic and should not form any limit to an implementation process of the embodiments of the disclosure.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
   acquiring, by a terminal, operating parameters of second carriers of a cell from a first carrier of the cell, a frequency band where the first carrier is located being lower than frequency bands where the second carriers are located;
   measuring, by the terminal, the second carriers of the cell according to the operating parameters of the second carriers of the cell to obtain measurement results for the second carriers of the cell;
   actively determining, by the terminal, a target carrier from the second carriers of the cell according to the measurement results for the second carriers of the cell; and
   communicating, by the terminal, with a base station through the target carrier.

2. The method of claim 1, wherein actively determining, by the terminal, the target carrier from the second carriers of the cell according to the measurement results for the second carriers of the cell comprises:
   actively determining, by the terminal, the target carrier from the second carriers of the cell according to the measurement results for the second carriers of the cell and a preset condition for selecting a target carrier.

3. The method of claim 1, wherein the operating parameters of the second carriers comprise coverage ranges of the second carriers, and actively determining, by the terminal, the target carrier from the second carriers of the cell according to the measurement results for the second carriers of the cell comprises:
   actively determining, by the terminal, the target carrier from the second carriers of the cell according to the measurement results for the second carriers of the cell, position information of the terminal and the coverage ranges of the second carriers.

4. The method of claim 1, wherein the operating parameters of the second carriers of the cell are configuration parameters of Reference Signals (RSs) of the second carriers of the cell, and the measurement results for the second carriers of the cell are configured for indicating qualities of the RSs of the second carriers of the cell.

5. The method of claim 1, wherein the operating parameters of the second carriers comprise coverage ranges of the second carriers, and the method further comprises:
   determining, by the terminal, whether the target carrier needs to be handed over according to the measurement results for the second carriers of the cell, position information of the terminal and the coverage ranges of the second carriers.

6. A device for wireless communication, comprising: a memory and a processor, the memory storing one or more computer programs that, when executed by the processor, cause the processor to execute operations comprising:
   acquiring operating parameters of second carriers of a cell from a first carrier of the cell, a frequency band where the first carrier is located being lower than frequency bands where the second carriers are located;
   measuring the second carriers of the cell according to the operating parameters of the second carriers of the cell to obtain measurement results for the second carriers of the cell;
   actively determining a target carrier from the second carriers of the cell according to the measurement results for the second carriers of the cell; and
   communicating with a base station through the target carrier.

7. The device of claim 6, wherein the operations further comprise:
   actively determining the target carrier from the second carriers of the cell according to the measurement results for the second carriers of the cell and a preset condition for selecting a target carrier.

8. The device of claim 6, wherein the operating parameters of the second carriers comprise coverage ranges of the second carriers, and the operations further comprise:
   actively determining the target carrier from the second carriers of the cell according to the measurement results for the second carriers of the cell, position information of the terminal and the coverage ranges of the second carriers.

9. The device of claim 6, wherein the operating parameters of the second carriers of the cell are configuration parameters of Reference Signals (RSs) of the second carriers of the cell, and the measurement results for the second carriers of the cell are configured for indicating qualities of the RSs of the second carriers of the cell.

10. The device of claim 6, wherein the operating parameters of the second carriers comprise coverage ranges of the second carriers, and the operations further comprise:
    determining whether the target carrier needs to be handed over according to the measurement results for the second carriers of the cell, position information of the terminal and the coverage ranges of the second carriers.

\* \* \* \* \*